(12) United States Patent
Day et al.

(10) Patent No.: US 7,546,393 B2
(45) Date of Patent: Jun. 9, 2009

(54) SYSTEM FOR ASYNCHRONOUS DMA COMMAND COMPLETION NOTIFICATION WHEREIN THE DMA COMMAND COMPRISING A TAG BELONGS TO A PLURALITY OF TAG GROUPS

(75) Inventors: Michael Norman Day, Round Rock, TX (US); Harm Peter Hofstee, Austin, TX (US); Charles Ray Johns, Austin, TX (US); Peichum Peter Liu, Austin, TX (US); Thuong Quang Truong, Austin, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 11/695,436

(22) Filed: Apr. 2, 2007

(65) Prior Publication Data

US 2007/0174509 A1    Jul. 26, 2007

Related U.S. Application Data

(62) Division of application No. 10/448,237, filed on May 29, 2003, now Pat. No. 7,200,688.

(51) Int. Cl.
*G06F 13/28* (2006.01)

(52) U.S. Cl. .................. 710/22; 710/5; 710/20; 710/24; 710/62; 710/312

(58) Field of Classification Search ............ 710/5, 710/20, 22, 24, 62, 312
See application file for complete search history.

(56) References Cited

U.S. PATENT DOCUMENTS

| | | | |
|---|---|---|---|
| 6,205,494 B1 | 3/2001 | Williams | |
| 6,324,598 B1 | 11/2001 | Olson et al. | |
| 6,609,192 B1 | 8/2003 | Guthrie et al. | |
| 6,983,452 B1 * | 1/2006 | Willems | 717/128 |
| 7,200,688 B2 * | 4/2007 | Day et al. | 710/22 |

FOREIGN PATENT DOCUMENTS

WO    PCT/IB2005/003974    7/2005

* cited by examiner

*Primary Examiner*—Tammara Peyton
(74) *Attorney, Agent, or Firm*—Carr LLP

(57) ABSTRACT

The present invention provides for a system comprising a DMA queue configured to receive a DMA command comprising a tag, wherein the tag belongs to one of a plurality of tag groups. A counter couples to the DMA queue and is configured to increment a tag group count of the tag group to which the tag belongs upon receipt of the DMA command by the DMA queue and to decrement the tag group count upon execution of the DMA command. A tag group count status register couples to the counter and is configured to store the tag group count for each of the plurality of tag groups. And the tag group count status register is further configured to receive a request for a tag group status and to respond to the request for the tag group status.

7 Claims, 2 Drawing Sheets

SYSTEM FOR ASYNCHRONOUS DMA COMMAND COMPLETION NOTIFICATION WHEREIN THE DMA COMMAND COMPRISING A TAG BELONGS TO A PLURALITY OF TAG GROUPS

CROSS-REFERENCED APPLICATIONS

This application is a division of, and claims the benefit of the filing date of, co-pending U.S. patent application Ser. No. 10/448,237 entitled Method for Asynchronous DMA Command Completion Notification, filed May 29, 2003 now U.S. Pat. No. 7,200,688.

TECHNICAL FIELD

The invention relates generally to asynchronous command completion notification and, more particularly, to employment of tag groups with DMA commands.

BACKGROUND

In conventional symmetric multiprocessor systems, multiprocessors comprising a plurality of main processor units (MPUs) have direct access to common shared memory through the employment of load/store instructions. In an asymmetric multiprocessor environment, MPUs are arranged in a conventional shared memory style. Specialized, or attached processor units (APUs) having their own private instruction and data memory are also present. However, APUs only have indirect access to system memory through a "block" move direct memory access (DMA) controller. This block move DMA controller can transfer data between system memory and the private instruction and data memory ("local store") of the APU when programmed to do so by software executing in the APU.

In conventional systems having third party DMA controllers, each relevant device in the heterogeneous system is assigned a DMA channel to utilize. This channel is then used by software to effect DMA transfers between system memory and the device. The DMA channel can typically be programmed for a single DMA operation at a time. Unlike third party DMA controllers, first party DMA controllers, wherein the device issues its own DMA commands (as a master), typically utilize a DMA command list placed in system memory by the MPU program. The device then utilizes this list in system memory to determine the DMA operations to perform in conjunction with the commands that it is executing. Normally, there are command status words in memory that the device updates, based upon the success or failure of the command and its associated DMA operation.

DMA commands can be placed in a DMA "queue" directly by the program executing on the APU. In order to provide high performance and efficiency in a heterogeneous system having attached processors with private local stores, it is typically advantageous for the APU program to overlap and coordinate program execution with the DMA controller. To do this efficiently generally requires the capability for the APU to queue up multiple DMA commands and delay checking on the status of the DMA commands until there is a dependency on the DMA command completing with respect to program execution.

Conventional heterogeneous systems do not provide a solution for an environment wherein the APU has direct access to its own private storage, but indirect access through DMA to system memory, yet is of very high performance. For efficiency, a significant number of DMA commands should be queued and executed in parallel to prevent the APU program from continually being delayed, waiting for data transfers to complete.

Therefore, what is needed is a method of determining the status of previously issued asynchronous DMA commands to allow for efficient data movement and program execution synchronization.

SUMMARY OF THE INVENTION

The present invention provides for a system comprising a DMA queue configured to receive a DMA command comprising a tag, wherein the tag belongs to one of a plurality of tag groups. A counter couples to the DMA queue and is configured to increment a tag group count of the tag group to which the tag belongs upon receipt of the DMA command by the DMA queue and to decrement the tag group count upon execution of the DMA command. A tag group count status register couples to the counter and is configured to store the tag group count for each of the plurality of tag groups. And the tag group count status register is further configured to receive a request for a tag group status and to respond to the request for the tag group status.

BRIEF DESCRIPTION OF THE DRAWINGS

For a more complete understanding of the present invention, and the advantages thereof, reference is now made to the following detailed description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
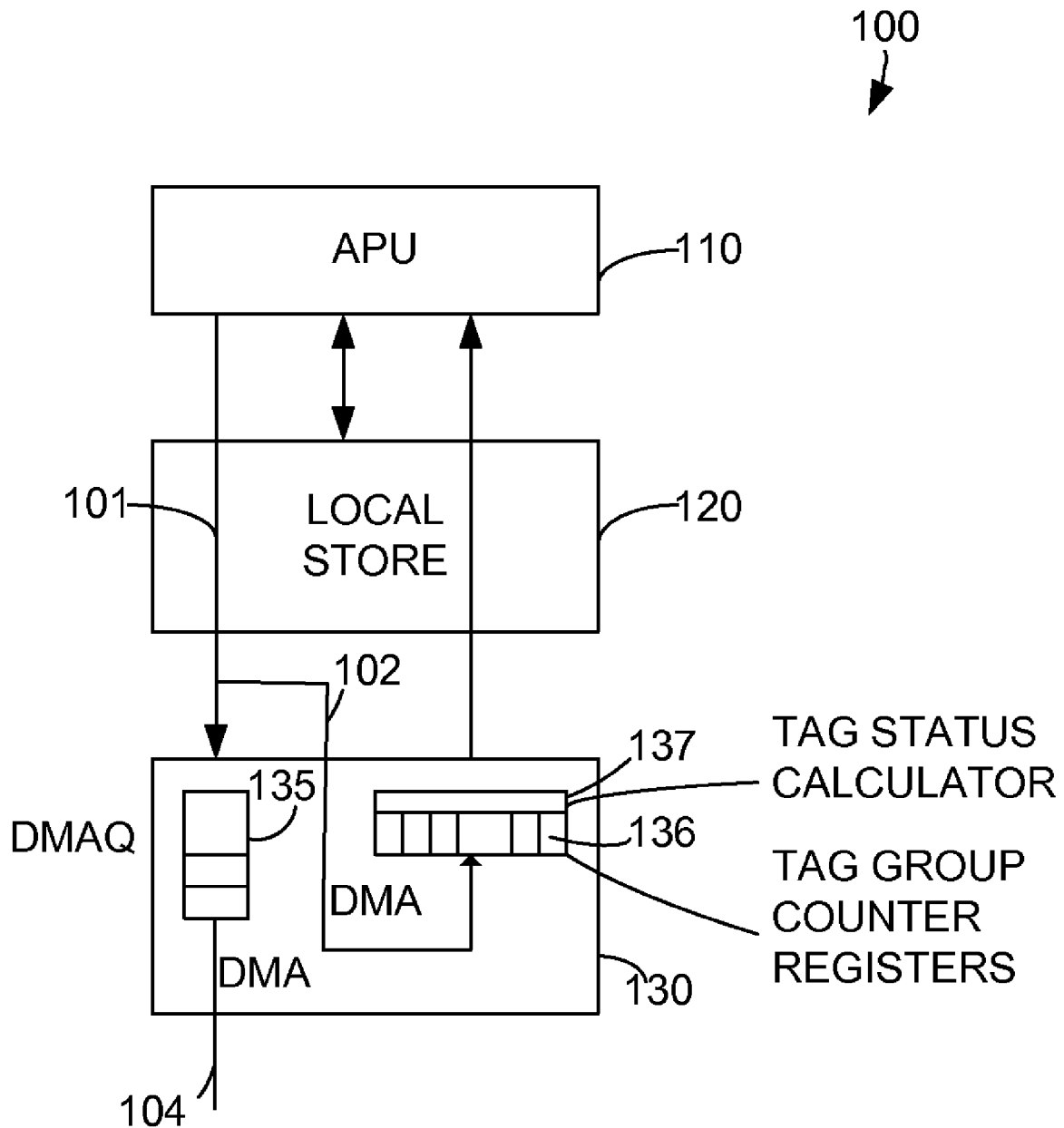
FIG. 1 schematically depicts a system for detecting DMA tag group command completion.

Turning to FIG. 1, disclosed is a DMA tag system 100 for detecting DMA tag group completion. The tag system 100 comprises an APU 110. The APU 110 is coupled to a local store (LS) 120. The APU 110 is further coupled to a DMA engine 130. The DMA controller 130 has a DMA queue (DMAQ) 135, tag group counter registers 136, and a tag status register 137.

In the system 100, when the APU 110 generates and queues a DMA command over bus 101 to the DMAQ, the APU 110 attaches a tag group indicia as well. The tag group indicia indicates to which specific collection or group of commands the DMA command belongs.

As each DMA command arrives in the DMAQ 135, the command count of the tag group in the tag group counter is incremented, as the DMA command tag group is transmitted over bus 102 and affects the values within the command counter registers 136. For instance, if there are four DMA commands of tag group "12" in the DMAQ 135, and one more DMA command of tag group "12" is received by the DMA queue, the tag group counter in the command counter registers 136 for group 12 would be incremented to contain the number 5. At the time of the queueing of the DMA command, the tag group count is incremented by one.

Once in the DMAQ 135, the commands are ordered to be executed by the DMA engine 130. These commands are transmitted to other devices over the command bus 104. Once the commands have been executed, and the DMA engine 130 has been so notified of its completion over the command bus 104, the DMA engine 130 orders the decrement of the count of the tag counter in the tag counter register 136 corresponding to the tag group of the completed DMA command. The count, after incrementing or decrementing for a tag group, can be zero, one, two, and so on. In one embodiment, this can be up to a maximum count that is at least as large as the maximum command queue depth of the DMAQ 135. This allows software more flexibility to put all of the commands into a single tag group.

The APU program of the APU 110 can then determine the tag register status of a selected tag group. This is determined through checking the tag status register 137, such as by checking an additional tag status channel defined within the command bus line 101 from the APU 110 to the DMA engine 130. The tag status channel has a value of "1" or a "0" for that tag group ID. A value of "1" can mean that there is at least one command in the group outstanding, and a value of "0" can mean that there are presently no commands in the tag group outstanding. For a given tag group ID, the APU only determines whether the DMA engine 130 is finished with a particular tag group, not how many more executions a particular tag group has to go. Based upon this information, the APU 110 can make appropriate processing decisions.

With the flexibility of this approach, software can group DMA commands in order to manage them. For instance all commands for a particular "task" can be grouped into a single tag group. Alternatively, all DMA "get" commands can be placed in a group separate from an output group comprising all DMA "put" commands. In addition, hardware can provide additional command parallelism or ordering rules with respect to groups. The APU software can verify that a single group has completed, all groups have completed, or a specified set of groups have completed operations. In the current embodiment, tag group status is supplied by the APU reading a data channel, where each bit in the channel represents a tag group status. Bit 0 represents tag group 0 status, bit 1 tag group 1 status, and so on up to bit 31 for tag group 31. A 0 indicates the tag group is complete, a 1 in the corresponding position indicates the tag group has one or more outstanding commands not yet completed.

There are several variations on the above and a number of advantages associated with the different variations. In one embodiment, the DMA queue 135 can store up to 32 DMA commands. All DMA commands in the DMA queue 135 could have the same tag group number, they could all have different tag group numbers, or anything in between.

Some advantages associated with the above are as follows. When a data transfer would require multiple DMA commands to accomplish the data transfer, the APU can check to see the status of the associated tag group for that set of DMA commands, which is easier than the prior art system, in which the program had to track the execution of each individual DMA command.

Figure 2:
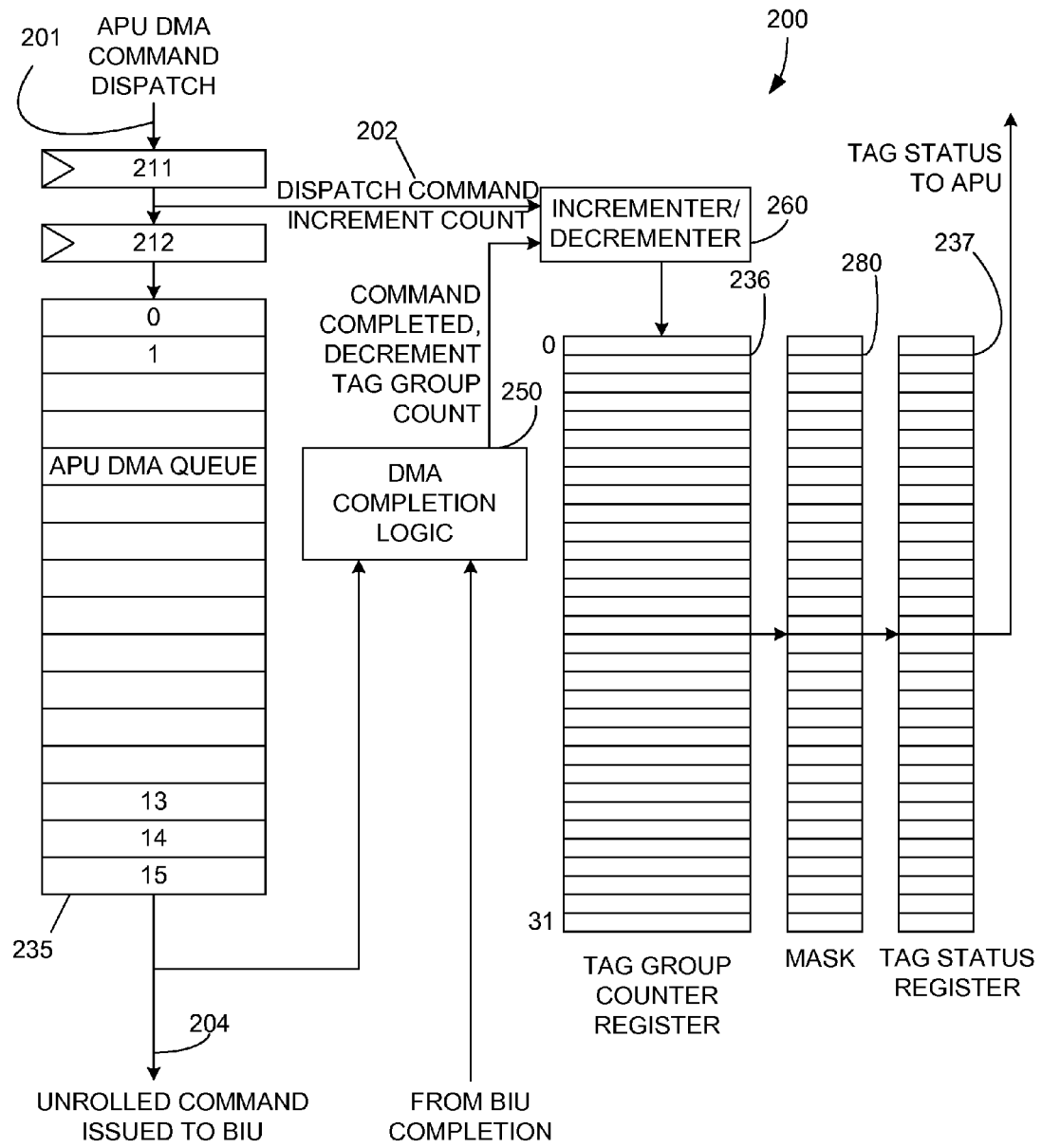
FIG. 2 illustrates a more detailed illustration of a system for detecting DMA tag group command completion.

Turning now to FIG. 2, disclosed is a tag system 200 within the DMA controller 130 for detecting tag group completion. The tag system 200 comprises a bus 201 from which DMA commands from the APU 110 are generated. The system 200 further comprises a DMAQ 235 which stores DMA commands. System 200 further comprises a bus 202 coupled from the input of the DMAQ 235 to an incrementer/decrementer 260. The DMAQ 235 is further coupled to a DMA completion logic 250 and to a bus interface unit (BIU, not shown) over a bus 202. The BIU has input a command completion bus into the DMA completion logic 250. The DMA completion logic 250 is also coupled as an input into the incrementer/decrementer 260. The incrementer/decrementer 260 is in turn coupled to a tag group count register 236. The tag group count register 236 is coupled to a mask 280, which is coupled to a tag status register 237. The tag status register 237 is in turn coupled to the APU 110.

In the system 200, a DMA command having a tag group number indicia generated by the APU 110 is received into a first latch 211. The first latch 211 then transmits the DMA command having a tag group indicia into a second latch 212. However, during that transmission, a copy of the tag group indicia is sent to the incrementer/decrementer 260. The incrementer/decrementer 260 increments the number associated with the tag group of the DMA command. For instance, if the tag group is number 12, the tag group for number 12 would be incremented by one, if the tag group is number 14, the tag group for number 14 is incremented by one, and so on.

The DMA command is then placed into the DMA queue 235. The DMA command with tag indicia is queued until it has its turn to be issued to the BIU. The DMA command with tag indicia is then issued to the BIU. However, the DMA command having tag group indicia is also forwarded to the DMA completion logic 250. Generally, the DMA completion logic 250 keeps track of which DMA commands have been issued and which ones have been completed. Whenever an unrolled DMA command is completed, the DMA completion logic 250 is so notified by the BIU. Once the DMA completion logic 250 determines that a given DMA command with tag indicia is completed, the DMA completion logic 250 forwards this information to the incrementer/decrementer 260. The incrementer/decrementer 260 then decrements the tag group count within the tag group count register corresponding to the decremented group.

In the system 200, the tag group count registers 236 can have a count from zero (that is, no DMA commands for this group are outstanding) to an integer that comprises the size of the DMAQ 235. In the system 200, the tag group count registers 236 can be masked. This is generally performed to mask non-selected tag groups. In one embodiment, the mask consists of zeros in all cells that correspond to tag groups that are not selected by the APU 110, and a value of one in the position of the mask that does correspond to the tag group that is selected by the APU 110.

For instance, if the APU 110 selects for tag group 8, then the mask value of mask 280 in slot 8 is one, and the rest of the mask values are zeroes. If the APU 110 selects for tag group 24, then the mask value of mask 280 in slot 24 is one, and the rest of the mask values are zeroes, and so on. The value within each tag group is transmitted through the mask 280. For instance, if the value of group 8 is zero, then the value zero is transmitted through the mask 280. If the value of tag group 24 is thirteen (that is, there are thirteen uncompleted DMA commands within this tag group), then the value one is transmitted through the mask 280.

The mask 280 is then read by the tag status register 237. The tag status register 237 reads the appropriate value transmitted by and through the mask 280 and determines whether the value is a zero or a non-zero value. If the tag group count of the tag group count register 236, as transmitted through the mask 280, has a zero value, then the tag status register 237 transmits a value of zero to the APU 110 for this tag group, indicating that all DMA commands for this tag group are completed. If the tag group count for the selected tag group has a non-zero value, then the tag status is transmitted to the APU 110 as a value of "one," indicating that there is at least one DMA command within the selected tag group that has not completed.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system, comprising:
    a DMA queue configured to receive a DMA command comprising a tag, wherein the tag belongs to one of a plurality of tag groups;
    a counter coupled to the DMA queue and configured to increment a tag group count of the tag group to which the tag belongs upon receipt of the DMA command by the DMA queue and to decrement the tag group count upon execution of the DMA command;
    a tag group count status register coupled to the counter and configured to store the tag group count for each of the plurality of tag groups;
    and wherein the tag group count status register is further configured to receive a request for a tag group status and to respond to the request for the tag group status.

2. The system of claim 1, further comprising an attached processing unit (APU) coupled to the DMA queue and configured:
    to group DMA commands into tag groups;
    to generate tags associated with the DMA commands;
    to transmit the DMA command and associated tag to the DMA queue; and
    to generate and transmit to the tag group count status register a request for tag group status.

3. The system of claim 1, further comprising a mask coupled to the tag group count register.

4. The system of claim 1, wherein the tag group count status register further comprises a tag status register configured to respond to the request for the tag group status.

5. The system of claim 1, further comprising a tag status register coupled to the mask and configured to respond to the request for the tag group status.

6. The system of claim 1, wherein the response indicates whether the tag group count is non-zero.

7. The system of claim 2, wherein the response indicates whether there are any DMA commands with tags belonging to the identified tag group that have not executed.

* * * * *